F. B. KING & R. L. STEVENS.
CLIP.
APPLICATION FILED SEPT. 25, 1913.

1,085,269.

Patented Jan. 27, 1914.

Inventors
Fred B. King.
Robert L. Stevens

Witnesses
Chas. W. Stauffiger
Anna M. Dorr

By
Attorneys

UNITED STATES PATENT OFFICE.

FRED B. KING AND ROBERT L. STEVENS, OF ALBION, MICHIGAN, ASSIGNORS TO NATIONAL SPRING AND WIRE CO., OF ALBION, MICHIGAN, A CORPORATION OF MICHIGAN.

CLIP.

1,085,269. Specification of Letters Patent. Patented Jan. 27, 1914.

Application filed September 25, 1913. Serial No. 791,693.

*To all whom it may concern:*

Be it known that we, FRED B. KING and ROBERT L. STEVENS, citizens of the United States of America, residing at Albion, in the county of Calhoun and State of Michigan, have invented certain new and useful Improvements in Clips, of which the following is a specification, reference being had therein to the accompanying drawings.

This invention relates to a clip for use in a spring seat construction and more especially to an arrangement thereof for securely clamping band and coil springs together and also to the frame or stay members of a seat.

The invention consists in the matters hereinafter set forth and more particularly pointed out in the appended claims.

Figure 3:
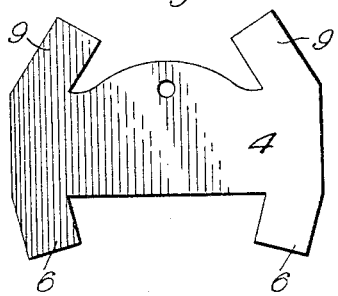
Figure 4:
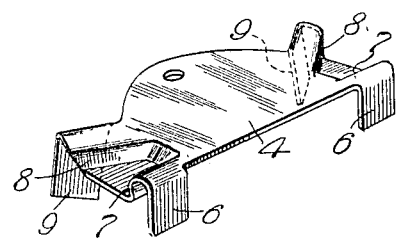
Figure 2:
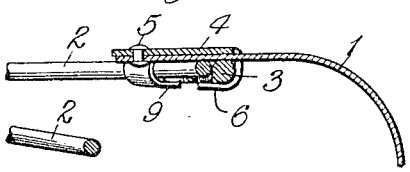
Figure 1:
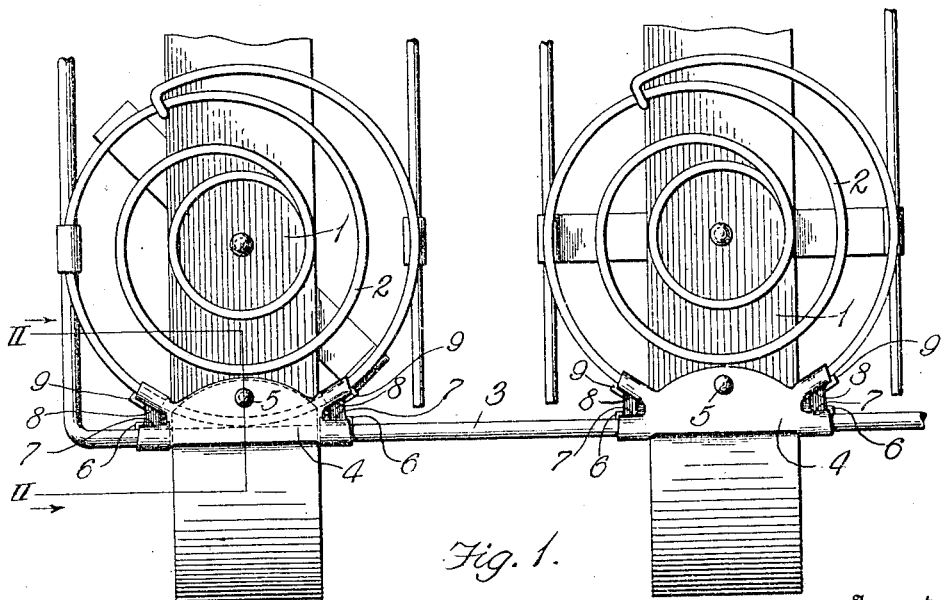

In the drawings: Figure 1 is a plan view of a portion of a spring seat provided with clips embodying features of the invention. Fig. 2 is a view in section taken on or about line II—II of Fig. 1. Fig. 3 is a plan view of a blank that may be conveniently used in forming the clip; and Fig. 4 is a view in perspective of a finished clip ready for application.

Referring to the drawings a band 1, of spring material that is secured to a spring structure as a component part thereof, has an inturned end portion that overlies the end coil or other convenient turn of an upright coil spring 2, and an adjacent stay or frame member 3 of the structure. A sheet metal clip 4 has a body portion that is superposed on the end portion of the band 1, and is secured thereto as by a rivet 5 passing through registering openings in the clip body and band. Oppositely disposed lateral projections 6 that are formed integrally on the outer margin of the clip blank and are bent transversely to the general plane thereof as indicated in Fig. 4, are inturned around the member 3 of the spring structure and hold the latter against shoulders 7 that are formed by depressed or off-set portions of the body of the clip at the base of each projection 6. Oppositely disposed, slightly oblique shoulders 8 that are a result of this off-setting, coöperate with other tongues or projections 9 formed from the body of the blank and turned down transversely to the plane thereof before application, to secure the clip to the coil 2 of the body spring. The obliquity of the shoulders 8 and the tongues 9 is sufficient to make each conform substantially to the bend of the coil.

As a result of the construction a clip is obtained that is adapted to hold a flat or bent spring and the coil of a body spring securely anchored to a stay or frame member of a spring seat construction in such manner as to prevent any accidental displacement of the parts.

Obviously changes in the details of construction may be made without departing from the spirit of the invention and we do not care to limit ourselves to any particular form or arrangement of parts.

What we claim as our invention is.

1. The combination in a seat construction of a coil spring, a band spring member and a stay member of a clip secured to the end portion of the band member and bent around the stay member and the coil of the body spring on both sides of the band member, the clip being off-set to form shoulders in the angles between the bend of the coil of the body spring and the adjacent stay member.

2. The combination in a seat construction of a coil spring, a band spring member and a stay member of a clip secured to the end portion of the band member and projections from the clip and bent around the stay member and the coil of the body spring on both sides of the band member, the clip being off-set to form shoulders in the angles between the bend of the coil of the body spring and the adjacent stay member.

3. The combination in a seat construction of a coil spring, a band spring member and a stay member of a clip secured to the end portion of the band member and projections from the clip bent around the stay member and other projections bent around the coil of the body spring on both sides of the band member, the clip being off-set to form shoulders in the angles between the bend of the coil of the body spring and the adjacent stay member.

In testimony whereof we affix our signatures in presence of two witnesses.

FRED B. KING.
ROBERT L. STEVENS.

Witnesses:
OTIS A. LEONARD,
BLANCHE H. HOYT.